Aug. 16, 1949.    C. D. PETERSON ET AL    2,479,183
POWER SHIFT AND CONTROL FOR CHANGE SPEED GEARINGS
Filed Oct. 3, 1944    2 Sheets-Sheet 1
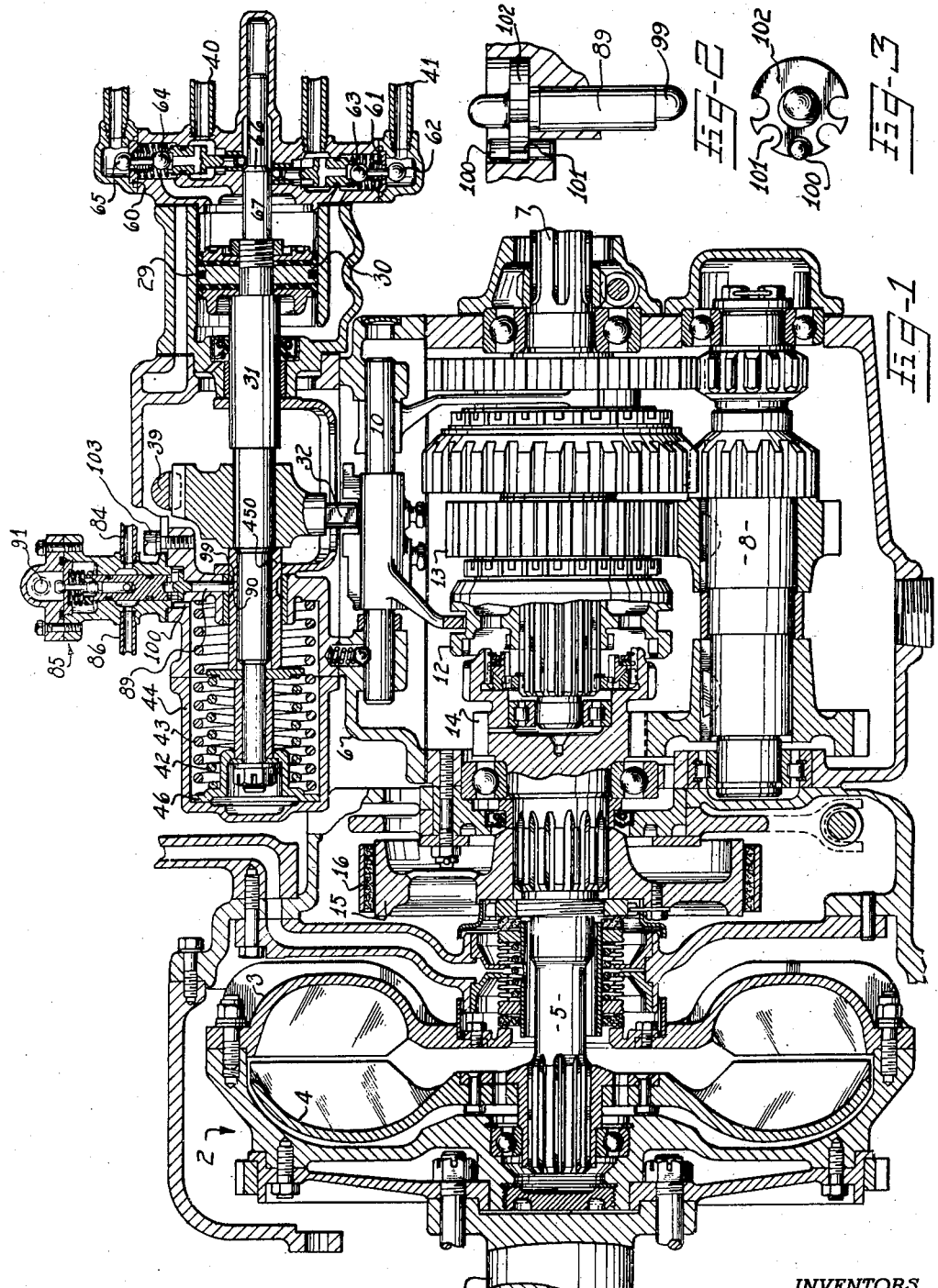
INVENTORS
CARL D. PETERSON
ALBERT H. DEIMEL
BY
ATTORNEYS

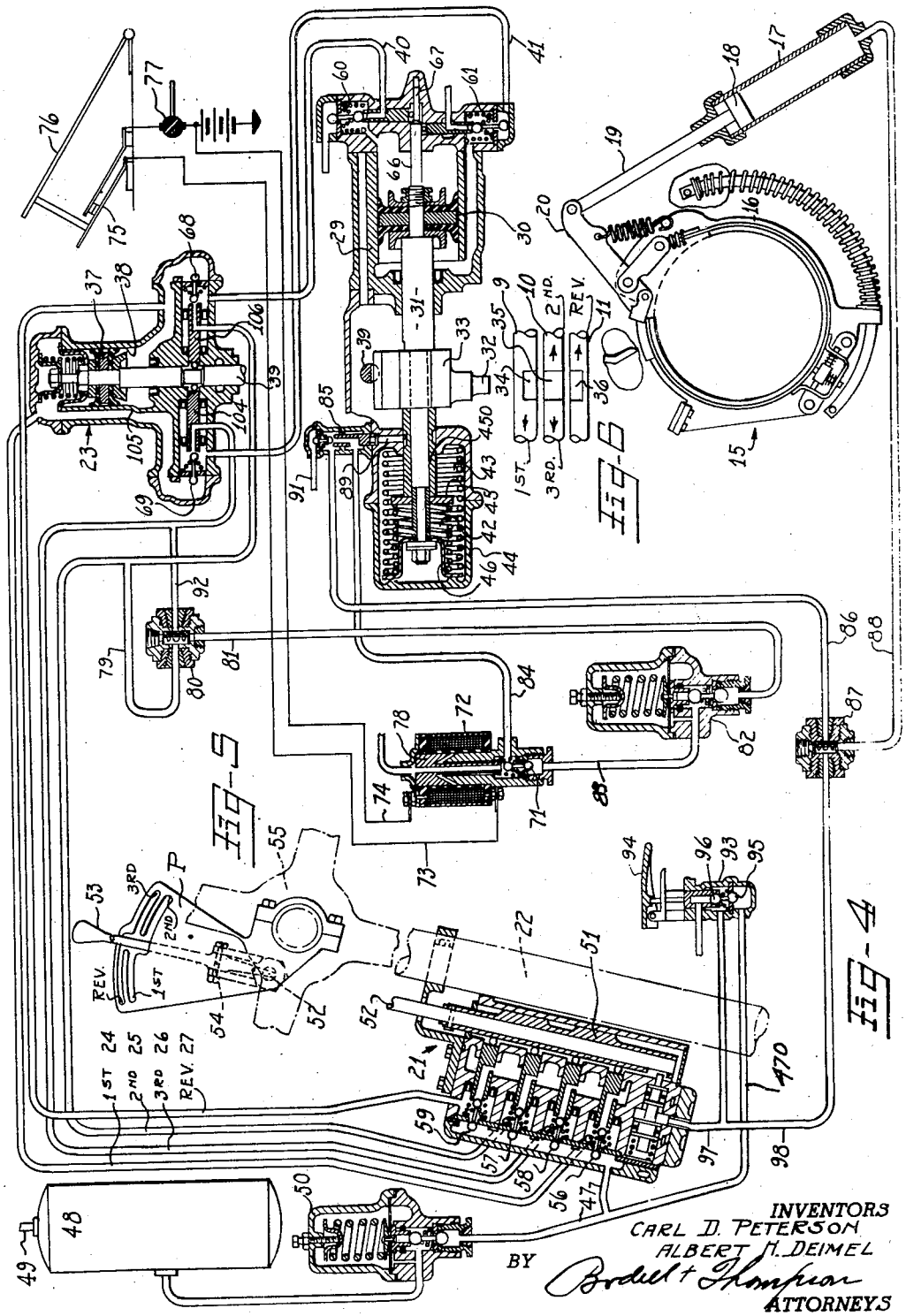

Patented Aug. 16, 1949

2,479,183

UNITED STATES PATENT OFFICE 2,479,183

POWER SHIFT AND CONTROL FOR CHANGE-SPEED GEARINGS

Carl D. Peterson and Albert H. Deimel, Toledo, Ohio, assignors to Dana Corporation, Toledo, Ohio, a corporation of Virginia Application October 3, 1944, Serial No. 556,962

8 Claims. (Cl. 74—472)

This invention relates to power shift, change speed transmission mechanisms, particularly where the power is a motive fluid, as compressed air, and has for its object a power shift mechanism including a motor having a movable member, as for example a cylinder and piston in which the piston is shifted in either direction from mid-position by the power and returned to mid-position by other means, usually spring means, and in which the application of the power to effect a shift in an opposite direction is delayed until the piston has been returned to mid-position by the spring means, thereby preventing the simultaneous application of spring and air power in the same direction, the air power always being opposed by spring power. Thus, return to mid-position is produced by spring power alone and not by the sum of spring power returning piston to mid-position and air power applied to move piston in the opposite direction from mid-position.

The invention further has for its object a power shift system for transmission gears including a power operated brake or its equivalent for synchronizing or crossing the speeds of the two parts to be engaged, in which power shift the brake is applied during the initial movement of the piston or the shiftable element out of starting or neutral position, and then is immediately released before the shiftable element engages, the release being effected by a cut-out valve for the brake motor located in a feed line controlled by an operator-operated member, as a selecting and shifting lever, during the selecting and shifting of that lever. It further has for its object the application of such brake only when the throttle for the engine which drives the transmission is in throttle closed position.

The system is particularly applicable to transmission gearing, which is actuated from the engine, through a hydraulic coupling and the shiftable element of a gearing embodying a balking ring clutch. The transmission gearing, coupling and the drive therefor, balking ring clutch, operator-operated selecting-shifting lever, piping system, etc., is analogous to that shown in our Patent No. 2,276,862 issued March 17, 1942. The differences between this application and that of the patent and pending application referred to reside in the control of the motor for effecting the power shift of the shiftable elements or clutches of the gearing, and in the control and operation of the crossing of the speeds brake for effecting quick shifts. These differences are:

(1) That the power or air can be applied to the shift motor or to the piston thereof only when the piston is in neutral or central position, to which position it has been returned when the power or air has been released, by other means, as spring means in opposition to the motive fluid or air.

(2) That the crossing of the speeds brake can only be applied when the throttle lever or accelerator pedal is in throttle closing position.

Other minor objects, as to details, appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of a transmission gearing embodying this invention or to which the control system is applied.

Figures 2 and 3 are detail views of parts of the operating means for the brake cut-out valve, Figure 2 being an elevation of the pin operated by the shifter or piston rod, and Figure 3 being an end elevation of the parts seen in Figure 2.

Figure 4 is a diagrammatic view of the control system for controlling the flow of air to the power actuator or the cylinder thereof and to the brake cylinder.

Figure 5 is a diagrammatic view illustrating in plan the driver-operated control lever of the system and contiguous portions of the steering wheel and column.

Figure 6 is a fragmentary view showing the shift rods of the gearing.

I designates a drive shaft, which is usually the crank shaft of an engine. 2 designates a hydraulic coupling including an impeller 3 and a runner 4, the impeller being suitably mounted on the shaft I to be actuated thereby and the runner 4 being mounted on the runner shaft 5, which is the input shaft of a change speed transmission gearing located within a gear box 6. The gearing within the gear box 6 also includes an output shaft 7, a countershaft 8 and gear trains between the two shafts to produce different speeds, as three speeds forward and reverse, the change from one ratio to another being effected by shiftable elements, preferably clutches, which are selected and shifted by power through three shift rods 9, 10 and 11 (Figure 6). One of these rods, as the middle rod 10, operates a double clutch 12, which, when shifted to the right into engaged position, clutches a gear 13 to the output shaft 7 to produce second speed forward, and when shifted to the left of neutral position clutches the shafts 5 and 7 directly together, producing third speed.

The clutch 12 is a balking ring clutch, that is, a clutch that is locked from engaging until the speeds of the two parts to be clutched together, cross.

The selecting of the shift rods 9, 10 and 11 is controlled by driver-operated lever which controls the power to a cross-shift or selector valve, which is operated by power, and a shift motor, as a cylinder and piston, for operating the selected rod. The speeds of the two parts to be clutched together are caused to cross quickly to effect a quick shift by a brake, which acts in this instance, indirectly on the balking ring, this brake being controlled by the closing of the throttle, when a new shift is selected by the operator-operated shifting and selecting lever. This brake is also operable by a driver-operated control member to unlock the balking ring, if a balking ring is used, or to bring teeth of gears to be brought into mesh out of abutting relation, when the shift is to be made from a standstill into first or reverse.

The construction of the gearing is substantially the same as in Patent No. 2,276,862, issued March 17, 1942, or our pending application, Serial No. 420,982, filed November 29, 1941, now abandoned. The motor for effecting the power shifting operates slightly different from that in said patent and application, in that power or air can not be applied to the piston of the motor to effect the shift until the piston has been shifted to central or neutral position, by means other than the power, as springs, or in other words, both the springs and the power are applied consecutively and not simultaneously.

The system includes means for effecting the successive application of the springs and the power or for causing or preventing the application of the power, except when the piston of the shifting motor is in central or neutral position, and hence after the clutch, as 12, has been shifted to central or neutral position.

15 designates the crossing-of-the-speeds brake, this being shown in Figure 1, as a brake drum mounted on the runner shaft 5 and as coacting with a brake band 16, which operates to retard the rotation of the runner for the purpose of making a quick shift from first to second and second to third, in this embodiment of the invention. The purpose of the brake band is to cause a quick crossing of the speeds preliminary to shifting in of the teeth or jaws of the clutch 12, and hence move either one or the other of the balking rings to unlocked position. This operation is the same as in our patent and application referred to.

In starting from standstill, the brake has a rocking movement to rock the shaft 5 reversely to unlock a balking ring, if a balking ring is used, in first or reverse gear trains or to actuate gears of either one of these trains sufficiently to bring their teeth out of abutting relation, if in abutting relation. The application of the brake for the purpose is controlled by a driver-operated member, as an applicator valve. The brake band is operated by a suitable motor, as a cylinder and piston motor, including a cylinder 17 and piston 18 therein, the rod 19 of which is connected to a lever arm 20 which operates links to contract the brake band 16 on the drum of the brake 15, substantially as in our patent referred to.

The system for controlling the flow of motive fluid, as air, to the shift cylinder or motor to effect the different shifts includes a control valve 21, usually mounted on the steering column 22 of the motor vehicle, and connected to a suitable source of motive fluid, as compressed air, a crossover or selector valve 23 connected to the control valve through pipes 24, 25, 26 and 27, which conduct the air to the cross-over valve, when said valve is set in first, second, third or reverse positions, respectively, and valves for delaying the flow of motive fluid to the shift cylinder until the piston is in central position. The shift motor includes a cylinder and piston 29 and 30, the rod 31 of which piston has a block 33 thereon capable of a rocking selecting movement to cause a finger 32 on the block 33 to selectively engage notches 34, 35 and 36 in the shift rods 9, 10 and 11, respectively, when said rods are in neutral position. The rod 31 or the block 33 thereon is rocked to make the selection by a motor embodied in the cross-shift or selector valve including a piston 37 movable in the cylinder 38 therein and connected at 39 to the block 33. 40 and 41 are branch outlet conduits in the air feed system from the selector or cross-shift valve to the cylinder 29 to conduct air to opposite sides of the piston, as will be hereinafter explained. 42 and 43 are springs located in a suitable casing 44 alined with the cylinder 29 and into which the piston rod 31 extends, these springs resisting movement of the piston 30 to the left and to the right respectively, and serving to return the piston to central position from shifted position, when the fluid pressure holding it in shifted position, has been released. The spring 42 thrusts to the right against shoulder 45 on the piston rod or a sleeve 450 thereon, and the spring 43 thrusts in the opposite direction against the shoulder 46 on the piston rod, the shoulder 46 abutting against the bottom of the casing 44. The piston rod slides relative to the shoulder 46 when the shift is to the left, and through the shoulder 45 when the shift is to the right. The cross-shift valve and the arrangement of the springs 42, 43 are substantially the same as in the patent and application referred to. The spring 42 acting alone thrusts the piston 30 to the right to midway position in the cylinder 29. The spring 43 thrusts the piston 30 to the left to midway position.

The control valve 21 is connected to a suitable source of supply or motive fluid through a pipe 47 to a supply tank 48, which is connected through an inlet pipe 49 to a compresser, not shown. The pipe 47 has a suitable pressure-regulating or feed valve 50 therein of any suitable construction.

The control valve 21 includes an axially movable rotatable cam member 51, which is mounted on a rod 52 operated by an operator-operated selecting and shifting lever 53 pivoted at 54 to a bracket mounted on the steering column adjacent the steering wheel 55 and also pivotally connected to the rod 52. The axes of the pivot 54 and of the rod 52 are at a right angle to each other, so that the lever 53 is moved about its axis 54 during the selecting movement to move the rod 52 and the cam member 51 axially, and fore and aft about the axis of the shaft 52 to rock the shaft 52, and thus move the cam member into position to open one of a number of valves, as valves 56, 57, 58 and 59 controlling the flow of air through the first, second, third and reverse conduits 24, 25, 26 and 27.

The control valve and operating lever are substantially the same as in the patent referred to.

The means for delaying the flow of air to the cylinder 29 until the piston 30 has been moved by the spring means 42, 43 to central position, as here shown, comprises normally open valves 60, 61 in the conduits 40, 41, respectively, that is, these valves are both open to inflow of motive fluid, when the piston 30 is in central or neutral position, one or the other of these valves being closed when the piston is moved out of neutral position. For ready identification, they may be called reversing valves. It will be understood that although both valves are open when the piston 30 is in neutral position, air is passed through only one of them, when the selecting and shifting lever 53 and hence the cross-over or selector valve 23 is operated. The valves 60 and 61 are of any suitable construction and are of the two-way or combined intake and exhaust type operating against the action of a returning spring. Upon actuation of the piston, when the air is coming through one valve, 60 or 61, the other valve is immediately closed to inlet of air and opened to the exhaust of air by the movement of the piston, bearing in mind that the valves 60, 61 control the flow of air to and from opposite sides of the piston 30, respectively.

62 designates the intake valve head and 63 the exhaust valve head of the valve 61, and 64 and 65 the intake and exhaust valve head of the valve 60. The valves are controlled by a cam 66 here shown as on a tail rod 67 of the piston 30.

In this embodiment of our invention, there is only one shift rod, that is, the second and third speed shift rod 10 that shifts in opposite directions from neutral, although with all three shift rods, the springs return the piston to central position. The delaying of the flow of air to the shift cylinder 29 until the piston is returned to central or starting position eliminates noise, violent shocks, etc. during the shifting operation.

Assume that the vehicle is running in first speed, and it is desired to make a shift into second speed. When in first speed, the finger 32 is in the notch 34 of the first speed shift rod 9, and hence to shift into second, it is necessary to move the driver-operated lever 53 to neutral position. This shifts the cam member 51 of the control valve 21 to close the first speed valve 56 of the selector valve 21, and causes the air to exhaust back through the first speed conduit 24, permitting the piston 30 to return to the right under the influence of its spring 42 to starting position, as in the patent and application referred to, this movement cutting off the air through the conduit 40, whereupon the spring means 42, 43 are free to re-act and overcome the pressure in the cylinder 29, resisting the shifting of the piston 30 from left hand position to neutral position, the cam 66 moving the valve members of both valves 60 and 61 to intake open position. When the air pressure is released by the setting of the selecting lever 53, any air at atmospheric pressure on the right side of the piston 30 exhausts through the valve 60, the exhaust head 65 of which has been opened by the cam 66. The operating lever 53 is then moved in the cross-over slot of the index plate P until alined with the second speed slot, as indicated in Figure 5 and moved into the second speed slot. This opens the valve 57 of the control valve 21 to the intake of air to the conduit 25 to the selector valve 23, operating the piston therein to open a valve member 68 to permit air to flow through the conduit 40, past the open valve 61 therein to the left end of the cylinder 29 and actuate the piston 30 to the right from neutral position. Now to make a shift into third speed forward, the selector lever 53 is moved into the cross-overslot of the index plate P in line with the third speed slot, and when moved into the third speed slot, positioning the selector valve 23 to permit air to flow past the valve member 69 of the cross-shift selector valve 23 through pipe 41 to the right end of the selector 29, shifting the piston 30 from neutral position (where it has been shifted by the spring 43, to the left) to shift the shift rod 10 to the left. Second and third speeds are effected by the same shift rod and the second and third speed slots in the index plate are in alinement. During the movement of the piston to the left, the valve 61 is held in intake position by the cam 66 while the movable member of the valve 60 is moved to exhaust position.

Thus, by reason of the cam 66 and the valves 60 and 61, the shift piston 30 can not have air applied thereto until it has returned to central position, and hence the shiftable element or clutch 12 returned to neutral position.

In the gearing here illustrated, which has three speeds forward and reverse, it is desirable to make a quick shift only into second and into third speeds. The quick shift is accomplished by applying the brake band 16 to the brake drum 15 during these shifts, but only when the engine connected to the shaft 1 has been throttled, or when the throttle lever or accelerator pedal is in throttle closing position. The air to the brake cylinder 17 is controlled by the initial shifting of the second and third speed shift rod 10 out of neutral position, and hence the shifting of the balking ring clutch 12 in either direction toward balk position. Air can flow to the brake cylinder, and hence the brake can only be applied when the throttle of the engine is closed. The flow of air to the brake cylinder is controlled by a valve 71 which is in turn controlled by the throttle lever, and by the shifting of the power shift piston through a cut-out valve. The valve 71, which is normally closed, and here shown as operated by electromagnetic means, as a solenoid 72, the coils of which are connected by wires 73, 74, in a feed circuit through a switch 75, which is closed when the throttle is closed, or when the throttle lever or accelerator pedal 76 is in trottle closing position. When the switch is thus closed, the solenoid 72 will be energized and its core 78 pulled downwardly, opening the valve 71 to the intake of air and when so opened, the air passes from the second speed supply pipe 25 through branch by-pass 79, which connects into the pipe 25, between the control valve 21 and the cross-shift selector valve 23, through check valve 80, which is a double check valve for a purpose hereinafter described, then through pipe 81, pressure regulating valve or feed valve 82, conduit 83 through the valve 71, now in intake position, thence through pipe 84 to a cut-out valve 85 of the type shown in said patent, this being mounted in position to be normally open but closed when the piston 30 shifts out of neutral, thence through pipe 86, double check valve 87 and conduit 88 to the brake cylinder 17, the conduit 88 being flexible to allow oscillating movement of the brake cylinder 17 during the application of the brake.

The cut-out valve 85 is operated by a sliding pin 89 of special construction, this pin coacting at its inner end with a cam groove 90 in the shift rod 10 or the sleeve thereon, this groove being of such length as to permit the valve to be held for a predetermined period during the shifting out of central position toward balking position of the clutch 12. The pin 89 is of a construction to vary the time element that the valve 85 is open to the intake of air while the shift is being made from neutral toward balk position. This valve is a two-way or combined intake and exhaust valve, and when it is closed by shifting to balk position, the air exhausts from the brake cylinder back through the pipes 88, 86, valve 85 and exhaust 91. Thus, the brake band 16 is applied only momentarily, while the engine throttle is closed, to effect a quick crossing of the speeds, and a quick shift into second or third without destroying the inertia of the engine and of the rotating parts.

When the shift is being made into third speed, that is, when the driver-operated lever 53 is moved into the third speed slot of the index plate P and the cam member 51 of the control valve 21 opens the valve 58, the air flows through the third speed conduit 26 to the cross-over selector valve 23 and from the conduit 26, through by-pass or branch 92, double check valve 80 to the brake cylinder, as before, the pipe 92 leading from the conduit 26 between the control valve 21 and the selector or cross-shift valve 23. The double check valve 80 is for the purpose of preventing air from entering the pipe 92 and the third speed conduit 26, when a second speed shift is made, and from entering the pipe 79 and the second speed conduit 25, when a shift is being made into third speed.

In order to facilitate the shift into first or reverse, an operator-operated applicator valve is provided for controlling the flow of air to the brake cylinder 19. 93 designates the applicator valve, which is operated by a suitable lever, as a toe-operated lever 94, to open a normally closed intake valve head 95 and close an exhaust valve head 96 of a two-way or combined intake and exhaust valve. When open, air passes through the branch 470 of the feed pipe 47 to the valve 93, past the valve head 96, which is held opened by the depression of the lever 94, through pipe 98 and the double check valve 87 and pipe 88 to the cylinder 17 to actuate and rock the brake therein to bring a balking ring clutch in the first and/or reverse gear trains to unlocked position or to bring gears in said trains, so that their teeth are out of abutting relation, if they are in abutting relation, when a shift is attempted to be made. The double check valve 87 prevents air from passing back through the pipe 86 to the cut-out valve 85, when the applicator valve 93 is opened and also prevents air from passing from the pipe 86 out through the applicator valve. Thus, when a shift is to be made by operating the manual selecting and shifting lever 53, the air will pass through the cut-out valve 85 to the brake and operate the brake to effect a quick crossing of the speeds, when a shift is to be made into second or third speed, if the throttle lever 78 is in throttle closing position. The applicator lever 94 can be operated at any time to let air flow to the brake cylinder 17 to use the brake as a vehicle brake.

The pin 89 for operating the valve 85 is made so as to adjust the time period that the valve remains open to the passage of air to the cylinder 17 during the shift toward balk position.

The operating pin 89 for the cut-out valve, which works in the cam groove 90 in the piston rod 31 or a sleeve thereon is made adjustable to vary the brake application time from neutral position of the clutch 12 or the power shift piston 30, and to correct manufacturing variations between the mating parts of the clutch. As best seen in Figure 2, the pin 89 is provided with an eccentric end portion 99 which extends into the cam groove 90. Obviously, by turning the pin about its axis, the eccentric portion 99 will be shifted in a direction lengthwise of the groove, more or less, to locate it centrally of the groove or locate it, if desired, nearer one end of the groove than the other, in accordance with the conditions it is required to correct. The pin is held from turning when the eccentric portion is in the proper position by means of a detent pin 100 carried by the casing 46 and located in a counterbore at the outer end of the bore in which the eccentric pin 89 is located. The detent pin 100 is placed in position to pass through any one of a plurality of notches 101 in a collar 102 on the pin 89 and located in the counterbore or the pin 89 lifted and turned to aline any selected notch with the detent pin 100 fixed in the counterbore (Figure 2). When the parts are assembled, the detent pin is between the inner end of this casing and the bottom of the counterbore. The casing for the cut-out valve is secured in position in any suitable manner, as by screws 103.

With the operation of the manually operated selecting and shifting lever 53 in proper position to open the first speed pipe 24, air enters the upper end of the cross-shift selector or transfer valve 23 to actuate the piston 37 therein downward. The cam on the rod of the piston 37 first causes the valve 69 to be operated by the slide 104, permitting air to pass through the passage 105 of valve 23, past the open valve 69 and through the pipe 41 to the right end of the cylinder 29, and actuate the reverse shift rod 9. This action of the piston 37 through its piston rod and cam also idly operates a slide 106 which idly operates the valve 68. When the manual lever 67 is operated to open the reverse conduit 27 to the passage of air, the air passes therethrough to the lower portion of the valve 23 below the piston 37, moving the piston upwardly and causing the cam or the piston rod to operate the slide 106, and open the valve 68, so that now the air that passes into the valve to below the piston and also passes past the valve 68 and the pipe 40, valve 60, to the left hand end of the cylinder 29. The operation also incidentally idles the slide 104 and the valve 69. When the hand lever 53 is operated to select the second and third shift rod and is shifted into the second speed slot of the index plate P, the control valve 21 is set to permit air to flow through the second speed conduit 25 and the slide 106 being in normal position permits the air to flow through the conduit 40, past the valve 60 into the left end of the cylinder 29 and actuate the piston 30 to the right to effect the shift into second gear. When the hand lever 53 is set to select the second and third speed shift rod 10, and the shift made into the third speed slot of the index plate, the control valve 21 opens the third speed conduit or pipe 26 to the flow of air and the slide 104 being in normal position, the air will flow past the valve 69, which is open, and through the pipe 41 to the right end of the cylinder 29 actuating the piston to the left, and hence actuating the selected second and third speed shift rod to the left. The operation of this cross-over selector or transfer valve is the same as in the patent and pending application referred to.

All of the valves used in this mechanism are of a well known commercial construction.

By this system, owing to the valves 60 and 61, the shift by power in the opposite direction does not begin unless the piston is in neutral position or has been returned to neutral position by the spring 42 or 43. This provides a smooth shift without noise, vibration and shocks. Owing to the eccentric slide or pin 89 for operating the cut-out valve, which controls the timing of the crossing-of-the-speeds brake, upon the shifting of the clutch 12 or the piston 30 out of central position, the time may be accurately adjusted to vary the time of the brake application and to correct manufacturing variations.

Owing to the valve 71, which is in the feed line for the brake cut-out valve, the brake can not be applied to effect a quick crossing of the speeds, except when the throttle lever 76 is in throttle closing position. However, the brake may be applied by the foot applicator valve 93 at any time to be used as a vehicle brake or as a brake for crossing the speeds, when a shift is to be made into first gear or reverse with the vehicle at a standstill. When the applicator valve 93 is used, air is applied to the brake cylinder 17 at full pressure sufficient to reverse the runner shaft 4 when shifting into first speed or first when the vehicle is at rest and the engine running. When effecting a quick shift into second or third speed, the air is supplied to the brake cylinder through a pressure regulating valve 82 and the brake is applied with only enough friction to retard or reverse and not stop the runner. The slipping of the hydraulic clutch in this embodiment of our invention permits the runner shaft 5 to be rocked, as the runner may slip and be actuated reversely relatively to the impeller of the hydraulic coupling. The double check valves 80 and 81 permit connections to be made with minimum of piping.

What we claim is:

1. In a transmission mechanism, an element shiftable in opposite directions from neutral position into engaged positions to effect drives through different gear ratios, power means for shifting said element including a motor having a member movable in opposite directions from central position, a power feed system for energizing the motor to actuate the movable member thereof in opposite directions, and power reversing means controlled by the movement of the movable element for controlling the flow of power to the motor on opposite sides of said member, respectively, and operable to initiate the flow of power to one side or the other of said member only when the movable member is in central position, and means to return the movable member to central position, when the flow of power to the motor is cut off, and the motor is de-energized.

2. In a transmission mechanism, an element shiftable in opposite directions from neutral position into engaged positions to effect drives through different gear ratios, power means for shifting said element including a fluid operated motor having a piston shiftable in opposite directions from central position, a feed system for supplying motive fluid to the motor on opposite sides of the piston, reversing valve means controlled by the movement of the piston for controlling the flow of motive fluid to the motor on opposite sides of the piston respectively and operable to initiate the flow of motive fluid to one side or the other of said piston only when the piston is in central position, means independent of said power means to return the piston and parts operated thereby to central position, when the flow of motive fluid to the motor is cut off and the motive fluid exhausted from the cylinder, and a driver-operated control valve for initiating the flow of motive fluid to the reversing valve means.

3. In a transmission mechanism, an element shiftable in opposite directions from neutral position into engaged positions to effect drives through different gear ratios, power means for shifting said element including a fluid operated motor having a piston shiftable in opposite directions from central position, a feed system for supplying motive fluid to the motor on opposite sides of the piston, the power feed system having branches for supplying motive fluid to the motor on opposite sides of the piston, valves in said branches respectively, means operated by the movement of the piston for operating the valves to control the flow of motive fluid alternately therethrough and to delay the flow of motive fluid until the piston has been returned to central position; spring means for returning the piston in opposite directions to central position, and an operator-operated selecting control valve for initially selecting and effecting the flow of motive fluid through the feed system and said branches.

4. In a transmission mechanism, an element shiftable in opposite directions from neutral position into engaged positions to effect drives through different gear ratios, power means for shifting said element including a fluid operator motor having a piston shiftable in opposite directions from central position, a feed system for supplying motive fluid to the motor on opposite sides of the piston, the power feed system having branches for supplying motive fluid to the motor on opposite sides of the piston, reversing valves in said branches respectively, means operated by the movement of the piston for operating the reversing valves to control the flow of motive fluid alternately therethrough and to delay the flow of motive fluid until the piston has been returned to central position, spring means for returning the piston in opposite directions to central position, and a driver-operated selecting control valve for initially effecting the flow of motive fluid through the feed system and said branches, said reversing valves being combined intake and exhaust valves and both being normally arranged in intake open position and exhaust closed position, and means operable by the initial movement of the piston from central position for opening one reversing valve to the exhaust of motive fluid and closing the intake thereof, upon movement of the piston in one direction from neutral and to close the other reversing valve against the intake of motive fluid and open the exhaust thereof upon movement of the piston in the opposite direction from central position.

5. In a transmission mechanism, an element shiftable from neutral into an operated or engaged position, coupling two parts together in drive relation, power means for shifting said element including a motor having a movable member, a power feed system for supplying power to the motor to actuate the movable member thereof, means for controlling the flow of power to the motor, means for synchronizing the speeds of the two parts to be coupled together by the shiftable element before the engagement of said element, including a brake, and a motor for operating the brake, a feed line branched from the feed system leading to the brake motor, and having a normally closed valve therein, an engine throttle operating member, means operated thereby for opening the valve in the brake cylinder system only when the throttle control member is in throttle closing position, a normally open cut-out valve in the branch feed line in series with the valve controlled by the throttle operating member, and operated by the movement of the movable member of the first or shift motor to close said cut-out valve and open the brake branch cylinder line to the exhaust of motive fluid, thus releasing the brake while the shift of the shiftable element is being made from neutral to engaged position.

6. In a transmission mechanism for transferring the power of an engine having a throttle and throttle operating member, an element shiftable from neutral into an operated or engaged position, power means for shifting said element including a motor having a movable member, a power feed system for supplying motive fluid to the motor to actuate the movable member thereof, means for controlling the flow of motive fluid to the motor, means for synchronized the speeds of the two parts to be coupled together by the shiftable element before the engagement of said element, including a brake, and a motor for operating the brake, a feed line branched from the feed system leading to the brake motor, and having a normally closed valve therein, an engine throttle operating member, means operated thereby for opening the valve in the brake cylinder system only when the throttle control member is in throttle closed position, and a normally open cut-out device operated by the movement of the movable member of the first or shift motor to operate said device and de-energize the brake motor, thus releasing the brake while the shift of the shiftable element is being made from neutral to engaged position, the cut-out device including a sliding operating pin, a part movable by the movement of the movable member of the shift motor having a cam for receiving the pin, the pin having an eccentric portion in the groove and being adjustable about its axis for adjusting the movement of the eccentric portion of the pin in the groove, thus varying the timing of the cutting out operation of the cut-out device.

7. In a transmission mechanism including an element shiftable in opposite directions from neutral position into two different engaged positions to effect drives through the different gear ratios, a shifter connected to the shiftable element, a fluid power actuator therefor having a piston movable in opposite directions from neutral, motive fluid feed lines arranged to conduct power to opposite sides of the movable member to shift the same from neutral into opposite directions, additional means operable to shift said piston from power operated position back to neutral position, when the motive fluid from one or the other of the feed lines is released, operator-operated valve means for selectively controlling the flow of motive fluid alternately through said feed lines, a combined intake and exhaust valve in each of said feed lines, both arranged in open intake position when the movable member is in neutral position, and means operated by the movement of the piston in either direction from neutral to move one only of said valves to exhaust position, permitting the movable member to be actuated in one direction by power coming through the other intake open valve in the selected feed line and effecting the shifting of the shiftable element into one of its operated positions and thereby delaying the application of power to shift said shiftable element until the piston is in neutral position.

8. In a transmission gearing for transmitting the power of an engine having a throttle valve operating member, the gearing including an element shiftable from neutral into an operated or engaged position, a shifter connected to said shiftable element, a power actuator therefor including a movable member, a motive fluid feed line arranged to conduct power to the actuator to actuate said movable member in opposite directions, in one direction to shift the shiftable element into engaged position and in the other direction to shift it out of engaged position, operator-operated valve means for controlling the flow of motive fluid through said feed line, a combined intake and exhaust valve in the feed line and arranged in intake open position when the movable member is in neutral position, means for synchronizing the speeds of the two parts to be connected together by the shiftable element preliminarily to the shifting of the same into engaged position by the shifter, a motor for actuating said brake means, a feed pipe therefor branched from the feed line, a normally closed valve in the branch line, and means whereby it is operable to open position, and a cut-out valve in the branch feed line normally in open position, when the shiftable element is in neutral position, and operated to closed position by the movement of the shifter out of neutral position, whereby the brake is applied by the movement of the throttle lever to throttle closed position and immediately released upon the movement of the shiftable element out of neutral position.

CARL D. PETERSON.
ALBERT H. DEIMEL.

REFERENCES CITED

The following references are of record in the file of this patent:

UNITED STATES PATENTS

| Number | Name | Date |
|---|---|---|
| 1,933,740 | Kuwada | Nov. 7, 1933 |
| 2,016,839 | Schoenberger | Oct. 8, 1935 |
| 2,335,255 | Banker | Nov. 30, 1943 |
| 2,353,137 | Banker | July 11, 1944 |
| 2,358,846 | Andres | Sept. 26, 1944 |
| 2,360,976 | Peterson et al. | Oct. 24, 1944 |
| 2,373,453 | Brunken | Apr. 10, 1945 |